United States Patent [19]

Wakatsuki et al.

[11] Patent Number: 5,039,748
[45] Date of Patent: Aug. 13, 1991

[54] HIGH-STRENGTH POLYPROPYLENE FIBER

[75] Inventors: Kizuku Wakatsuki, Osaka; Noboru Yamaguchi, Chiba; Kazuki Wakamatsu, Chiba; Masahiro Kakugo, Chiba; Tadayuki Ohmae, Chiba, all of Japan

[73] Assignee: Sumitomo Chemical Co., Ltd., Osaka, Japan

[21] Appl. No.: 524,526

[22] Filed: May 17, 1990

Related U.S. Application Data

[63] Continuation-in-part of Ser. No. 269,043, Nov. 9, 1988, abandoned.

[30] Foreign Application Priority Data

Nov. 10, 1987 [JP] Japan .................... 62-284802

[51] Int. Cl.$^5$ .................... C08L 23/12; C08L 23/26; C08J 5/00; C08J 3/24
[52] U.S. Cl. .................... 525/216; 525/194; 524/528
[58] Field of Search .................... 525/216, 387, 194

[56] References Cited

U.S. PATENT DOCUMENTS

| | | |
|---|---|---|
| 2,947,598 | 8/1960 | Maragliano et al. .................... 18/54 |
| 3,207,739 | 9/1965 | Wales .................... 260/31.8 R |
| 3,887,534 | 6/1975 | Baba et al. .................... 525/387 |
| 4,551,501 | 11/1985 | Shiga et al. .................... 525/216 |
| 4,748,207 | 5/1988 | Kakugo et al. .................... 525/216 |

FOREIGN PATENT DOCUMENTS

| | | |
|---|---|---|
| 0148621 | 7/1985 | European Pat. Off. . |
| 0151883 | 8/1985 | European Pat. Off. . |
| 0171199 | 2/1986 | European Pat. Off. . |

OTHER PUBLICATIONS

Wales et al.–Crystallization–Modified Polypropylene–10/64–SPE Journal pp. 1113–1119.
Kresser–Polypropyline–5/61–pp. 130–131 Reinhold Plastic Applications Series.

*Primary Examiner*—Carman J. Seccuro
*Attorney, Agent, or Firm*—Sughrue, Mion, Zinn, Macpeak & Seas

[57] ABSTRACT

High-Strength polypropylene fiber is obtained from polypropylene having incorporated therein from 0.05 to 10,000 ppm by weight of a vinylcycloalkane polymer. The disclosed fiber polypropylene has an intrinsic viscosity of from 0.5 to 2.5 dl/g as measured in a tetralin solution at 135° C. and a ratio of weight average molecular weight to number average molecular weight of not more than 3.5/1.

4 Claims, No Drawings

HIGH-STRENGTH POLYPROPYLENE FIBER

CROSS REFERENCE TO RELATED APPLICATION

This is a continuation-in-part application of U.S. patent application Ser. No. 07/269,043, filed Nov. 9, 1988, now abandoned.

FIELD OF THE INVENTION

This invention relates to high-strength polypropylene fiber.

BACKGROUND OF THE INVENTION

The standard technique for enhancing strength of polypropylene fiber comprises increasing the draft ratio. In addition, various studies on stretching conditions, spinning conditions, molecular weight of polypropylene, and the like have been conducted for the same purpose.

For example, JP-B-54-32855 discloses a method comprising decreasing the molecular weight of polypropylene within a pelletizer. (The term "JP-B" as used herein means an "examined Japanese patent publication".)

Other methods for enhancing strength include a method in which spinning is carried out by using a polypropylene resin with high crystallinity is known. There have been made some proposals to attempt to improve the crystallinity of polypropylene. For example, it that when aluminum salts or sodium salts of aromatic carboxylic acids (see JP-A-58-80329), or aromatic carboxylic acids, aromatic phosphoric acid metal salts or sorbitol derivatives (see JP-B-55-12460, JP-A-58-129036, and U.S. Pat. No. 3,207,739) are added, they function as a nucleus-generating agent (hereinafter referred to as a "nucleating agent") for crystal nuclei to thereby improve the crystallinity. (The term "JP-A" as used herein means an "unexamined published Japanese patent application".)

However, among these nucleating agents, although the sorbitol derivatives exhibit an excellent nucleating effect, they usually bleed out of the resin and cause roll staining at spinning or generate a strong odor at processing; therefore, they are limited in terms of utility.

Moreover though the aluminum salts of aromatic carboxylic acids which have generally been used function as a nucleating agent, they generate a number of voids at molding of polypropylene or cause stretch cutting at stretching and, hence, have not always been satisfactory.

U.S. Pat. No. 4,551,501 discloses a process for adding a vinylcycloalkane polymer in order to improve the crystallinity of polypropylene and teaches that such a crystalline propylene polymer can be applied to fibers. However, the teachings of U.S. Pat. No. 4,551,501 are very general, and this U.S. patent does not suggest any requirement for obtaining high-strength polypropylene fiber.

Besides, U.S. Pat. No. 3,887,534 discloses a method in which a crystalline propylene polymer is degraded with a peroxide to improve processability. However, this U.S. patent does not at all suggest that in the case of production of polypropylene fiber, stretchability is improved to obtain a high-stength fiber.

As described above, any of the conventional techniques has a limit in achievement of strength of polypropylene fiber strength. It has been demanded that polypropylene fiber strength be further improved.

SUMMARY OF THE INVENTION

One object of this invention is to provide polypropylene fiber having improved strength.

The inventors have found that polypropylene having incorporated therein a vinylcycloalkane polymer provides polypropylene fiber having higher strength than conventional polypropylene fiber.

The present invention relates to high-strength polypropylene fiber obtained from polypropylene having incorporated therein from 0.05 to 10,000 ppm by weight of a vinylcycloalkane polymer, said polypropylene having an intrinsic viscosity of from 0.5 to 2.5 dl/g as measured in a tetralin solution at 135° C. and a ratio of weight average molecular weight to number average molecular weight of not more than 3.5/1.

DETAILED DESCRIPTION OF THE INVENTION

The vinylcycloalkane polymer which can be used in the present invention includes vinylcycloalkane homopolymers, copolymers comprising different kinds of vinylcycloalkanes, and copolymers comprising vinylcycloalkanes and up to 20 mol % of α-olefin or styrene comonomers.

The vinylcycloalkane polymers to be used are not limited by process for production and may be obtained by radical polymerization, cationic polymerization, anionic polymerization, coordination anionic polymerization, and the like. Of these techniques, the most preferred is coordination anionic polymerization, which is preferably carried out in the presence of a Ziegler-Natta catalyst composed of a transition metal compound and an organometallic compound that is commonly employed for polymerization of α-olefins. The vinylcycloalkane polymers can also be obtained by hydrogenation of styrene polymers.

Specific examples of vinylcycloalkanes as monomer include vinylcyclopentane, vinylcyclohexane, vinylcyclooctane, 2-methylvinylcyclohexane, 3-methylvinylcyclohexane, 4-methylvinylcyclohexane, 3-ethylvinylcyclohexane, 4-ethylvinylcyclohexane, allylcyclopentane, and allylcyclohexane.

The α-olefins and styrenes which can be copolymerized with the vinylcycloalkanes contain from 2 to 18 carbon atoms and specifically include α-olefins, e.g., ethylene, propylene, butene-1, octene-1, decene-1, 3-methylbutene-1, 4-methylpentene-1, 5-methylhexene-1, etc.; and styrenes, e.g., styrene, 2-methylstyrene, 3-methylstyrene, 4-methylstyrene, 4-ethylstyrene, etc.

The polypropylene having incorporated therein the above-described vinylcycloalkane polymer can be prepared as follows.

(1) Method comprising blending the vinylcycloalkane polymer and polypropylene

For blending, usual polymer blending techniques are employed to advantage. That is, powders or pellets of both polymers are mixed, and the mixture is kneaded with the polypropylene being molten. On the vinylcycloalkane polymer and polypropylene, both in a dissolved state, are mixed, and then the solvent is removed.

(2) A method comprising homo- or copolymerizing a vinylcycloalkane by using a catalyst for coordination anionic polymerization in a first stage and then homopolymerizing propylene or copolymerizing propylene and other α-olefins in a second stage.

(3) The method (2) above, in which the order of polymerization is reserved, or each of the first and second stages is repeated.

(4) A method comprising blending the vinylcycloalkane polymercontaining polypropylene as obtained in the method (2) or (3) above with ordinary polypropylene.

The polypropylene which can be used in the present invention is crystalline and includes a propylene homopolymer and a copolymer comprising propylene and up to 5 mol % of other α-olefins. The α-olefins herein used preferably include those recited as comonomers of the vinylcycloalkane copolymers. Further implicit in the polypropylene is polypropylene to which a vinyl-containing compound, e.g., maleic anhydride, styrene, etc., is grafted.

The molecular weight of the polypropylene which can be used in the present invention is controlled such that the intrinsic viscosity $[\eta]$ is from 0.5 to 2.5 dl/g, preferably from 0.7 to 1.7 dl/g, as measured in a tetralin solution at 135° C. If the intrinsic viscosity $[\eta]$ is less than 0.5 dl/g, the strength of the resulting fiber is low, whereas if it exceeds 2.5 dl/g, the processability is undesirably poor. Further, the polypropylene which can be used in the present invention has a ratio of weight average molecular weight (Mw) to number average molecular weight (Wn) of not more than 3.5/1, preferably not more than 3/1.

Such polypropylene can be readily obtained by, for example, adjusting polypropylene having an intrinsic viscosity $[\eta]$ of from 1.1 to 3.5 dl/g by heating or with a molecular weight reducing agent such that the intrinsic viscosity $[\eta]$ is reduced to 1/5 to 7/10. The molecular weight reducing agent which can be used is not particularly limited. Typical examples include organotin compounds, thiophosphite-based compounds, organic peroxides, thiazole-based compounds, and thiobisphenol-based compounds. Among them are particularly effective organic peroxides.

The vinylcycloalkane polymer-containing polypropylene according to the present invention can be spun and stretched under the same conditions as used for ordinary propylene polymers. For example, it is spun at a temperature of from 200° to 280° C. and stretched at a temperature of from 50° to 150° C., and it may further contain various additives generally employed, such as fillers and dye-assist agents.

Though decomposition of polypropylene by the molecular weight reducing agent may be carried out at spinning, it is preferably carried out at the kneading and pelletizing stages of polypropylene before the spinning. The amount of the molecular weight reducing agent added is appropriately determined within the range of from 0.0005 to 1.0% by weight, while taking into consideration the intrinsic viscosities of polypropylene and pellets obtained therefrom.

The present invention is now illustrated in greater detail with reference to the following examples, but it should be understood that the present invention is not deemed to be limited thereto. In these examples, all the percents and parts are by weight unless otherwise indicated.

Further, the molecular weight distribution (Mw/Mn) shown in these examples was measured by G.P.C. (gel permeation chromatography) under the following conditions. Moreover, a calibration curve was prepared by using standard polystyrene.

Apparatus: Model 150c (manufactured by Millipore Waters Inc.)
Column: Shodex M/S800
Measurement Temperature: 140° C.
Solvent: o-dichlorobenzene
Sample Concentration: 5 mg/8 ml

EXAMPLE 1 TO 3

1) Synthesis of Vinylcyclohexane Polymer-Containing Polypropylene

To 1,000 ml of dehydrated n-heptane were successively added 2.0 g of diethylaluminum chloride and 25.0 g of a titanium trichloride catalyst (product of Marubeni-Solvay Co., Ltd.) in a nitrogen gas atmosphere. The mixed solution was heated to 60° C., and 350 ml of vinylcyclohexane was added dropwise thereto while stirring to effect polymerization for 2.5 hours. The thus formed slurry was washed with n-heptane and dried under reduced pressure to obtain a polymer powder (9.85 g of vinylcyclohexane was polymerized per gram of the titanium trichloride catalyst).

In the presence of 252 g of the resulting powder containing the activated titanium trichloride catalyst and 180 g of diethylaluminum chloride, propylene was homopolymerized in 150 l of n-heptane at 60° C. for 1.5 hours at a pressure of 9 kg/cm$^2$G and at a hydrogen partial pressure of 0.6 kg/cm$^2$.

After completion of the polymerization, the catalyst was deactivated and deashed by using n-butanol to recover polypropylene (1,045 g of propylene was polymerized per gram of the titanium trichloride catalyst).

The vinylcyclohexane polymer content in the resulting polymer was calculated from the amounts of the polymerized vinylcyclohexane and polymerized propylene and found to be 0.94 wt %. The resulting polymer had an $[\eta]$ of 1.7 dl/g.

2) Spinning Polypropylene Pellets

To 100 parts of an ordinary propylene homopolymer having an $[\eta]$ of 2.7 dl/g were respectively added 0.065 part (Example 1), 0.65 part (Example 2) and 6.5 parts (Example 3) of the polymer powder as prepared in (1) above. To each of the mixture were further added 0.1 part of tetrakis[methylene-3-(3',5'-di-t-butyl-4'-hydroxyphenyl)propionate]methane ("Irganox ®" produced by Ciba-Geigy AG), 0.2 part of distearyl-3,3'-thiodipropionate ("Sumilizer ® TPS" produced by Sumitomo Chemical Co., Ltd.), 0.5 part of 2-(2-hydroxy-3'-t-butyl-5'-methylphenyl)-5-chlorobenzotriazole ("Sumisorb ® 300" produced by Sumitomo Chemical Co., Ltd.), and as a molecular weight reducing agent 0.1 part of 2,5-dimethyl-2,5-di-(t-butylperoxy)hexane, and the mixture was kneaded and pelletized. The resulting pellets had an $[\eta]$ of 0.91 dl/g, 0.89 dl/g and 0.91 dl/g and an Mw/Mn ratio of 2.2/1, 2.4/1 and 2.3/1, respectively.

3) Spinning and Stretching

The pellets obtained in (2) above were spun at 240° C. by the use of a spinning machine of screw gear pump type at a take-up speed of 280 m/min. The undrafted spun filaments were stretched at 110° C. at a stretch ratio of 3. The resulting stretched filament was determined for fiber strength, and the results obtained are shown in Table 1.

COMPARATIVE EXAMPLE 1

Drafted filaments were obtained in the same manner as in Example 1, except that the vinylcyclohexane polymercontaining polymer powder as prepared in Example 1-(1) was not used. The fiber strength of the resulting filaments is shown in Table 1.

TABLE 1

| Example No. | Vinylcyclohexane Polymer Content (ppm) | Drafted Filament | | |
| --- | --- | --- | --- | --- |
| | | Fineness (d) | Fiber Strength (g/d) | Elongation (%) |
| Example 1 | 6 | 16 | 2.2 | 88 |
| Example 2 | 60 | 16 | 2.4 | 106 |
| Example 3 | 573 | 15 | 2.5 | 93 |
| Comparative Example 1 | — | 18 | 1.8 | 91 |

As described above, there is provided by the present invention polypropylene fibers having improved strength.

While the invention has been described in detailed and with reference to specific embodiments thereof, it will be apparent to one skilled in the art that various changes and modifications can be made therein without departing from the spirit and scope thereof.

What is claimed is:

1. High-strength polypropylene fiber obtained from polypropylene having incorporated therein from 0.05 to 10,000 ppm by weight of a vinylcycloalkane polymer, said polypropylene having an intrinsic viscosity of from 0.5 to 2.5 dl/g as measured in a tetralin solution at 135° C. and a ratio of weight average molecular weight to number average molecular weight of not more than 3.5/1.

2. High-strength polypropylene fiber as claimed in claim 1, wherein said polypropylene is polypropylene prepared by degrading a propylene homopolymer or a copolymer comprising propylene and up to 5 mol % of other α-olefins, each having an intrinsitc viscosity of from 1.1 to 3.5 dl/g as measured in a tetralin solution at 135° C., with an organic peroxide or by heating so as to have its intrinsic viscosity reduced to 1/5 to 7/10.

3. High-strength polypropylene fiber as claimed in claim 1, wherein said polypropylene is a propylene homopolymer or a copolymer comprising propylene and up to 5 mol % of other α-olefins.

4. High-strength polypropylene fiber as claimed in claim 1, wherein said vinylcycloalkane polymer is a vinylcycloalkane homopolymer, a copolymer comprising different kinds of vinylcycloalkanes, or a copolymer comprising a vinylkcycloalkane and up to 20 mol % of α-olefin or styrene monomers.

* * * * *